(12) United States Patent
Howard et al.

(10) Patent No.: US 8,414,067 B2
(45) Date of Patent: Apr. 9, 2013

(54) PANEL ASSEMBLY

(75) Inventors: Nicholas George Howard, Bristol (GB); Andrew Grant Linklater, Somerset (GB)

(73) Assignee: Bailey Caravans Limited, Bristol (GB)

( * ) Notice: Subject to any disclaimer, the term of this patent is extended or adjusted under 35 U.S.C. 154(b) by 265 days.

(21) Appl. No.: 12/874,095

(22) Filed: Sep. 1, 2010

(65) Prior Publication Data

US 2011/0074180 A1 Mar. 31, 2011

(30) Foreign Application Priority Data

Sep. 30, 2009 (EP) .................................... 09171899

(51) Int. Cl.
*B62D 27/00* (2006.01)
*B62D 27/06* (2006.01)

(52) U.S. Cl.
USPC ........ 296/193.04; 296/29; 296/191; 403/205; 156/91

(58) Field of Classification Search ............. 296/29, 296/156, 191, 193.03, 193.04; 52/275, 276, 52/277, 278, 282.1, 282.4, 282.5, 466, 584.1; 403/205; 156/91; 29/525.01
See application file for complete search history.

(56) References Cited

U.S. PATENT DOCUMENTS 4,470,234 A * 9/1984 Rosner .......................... 52/282.5

FOREIGN PATENT DOCUMENTS

| DE | 14 30 780 A1 | 12/1968 |
| DE | 295 04 286 U1 | 5/1995 |
| DE | 101 61 643 A1 | 7/2003 |
| EP | 0 930 222 A2 | 7/1999 |
| FR | 2 057 719 A5 | 5/1971 |
| FR | 2 380 455 | 9/1978 |

OTHER PUBLICATIONS

European Search Report; Feb. 8, 2010 (1 pages).

* cited by examiner

*Primary Examiner* — Glenn Dayoan
*Assistant Examiner* — Jason S Daniels
(74) *Attorney, Agent, or Firm* — Husch Blackwell LLP

(57) ABSTRACT

A mobile vehicle comprising body shell composite panels and a method of joining body shell composite panels of a mobile vehicle.

10 Claims, 5 Drawing Sheets

PANEL ASSEMBLY

FIELD OF THE INVENTION

The present invention relates to a method of joining the edges of two panels, and a panel assembly so formed. The invention is particularly, though not exclusively, suitable for joining body shell panels of a mobile vehicle, such as a caravan or the like.

BACKGROUND OF THE INVENTION

The construction of mobile vehicles, such as caravans, motor-homes, box vans, etc., has changed little in the past few decades. Typically, the mobile vehicle has a body shell constructed from large composite panels, which form the front, back, sides and roof of the vehicle. With existing construction techniques, the panels are directly screwed together at their panel edges and the screw holes and seam are then sealed by covering the joint area with a narrow strip of material, or an extrusion such as an Aluminium "awning rail". Providing this seal to a consistent and acceptable cosmetic standard can be difficult to achieve by the existing construction techniques. It is also labour intensive and generates much wasted material. Moreover, the structural rigidity of the assembled panels is reliant on the consistency of the panel materials that are being screwed together and the skill of the operator.

SUMMARY OF THE INVENTION

A first aspect of the invention provides an assembly comprising two panels, a profiled section, and a plurality of fasteners, wherein an edge of each panel is received in a respective edge receiving profile of the profiled section, and a plurality of clamping brackets, wherein the clamping brackets are engaged with the panels, and the fasteners are connected between respective clamping brackets and the profiled section so as to clamp the edges of the panels between the profiled section and the clamping brackets at spaced intervals along the profiled section.

A further aspect of the invention provides a method of joining two panels, the method comprising positioning an edge of each panel in a respective edge receiving profile of a profiled section, engaging a plurality of clamping brackets with the panels, and connecting the clamping brackets to the profiled section using a plurality of respective fasteners so as to clamp the edges of the panels between the profiled section and the clamping brackets at spaced intervals along the profiled section.

The invention is advantageous in that the panels can be assembled together faster and more reliably than the prior art screwed construction techniques. The integrity of the joint is improved, leading to a improved structural rigidity of the completed assembly. The profiled section can have a smooth outer surface, which makes the joint more aerodynamic and hence when the invention is applied to a vehicle, the vehicle will be less prone to buffeting by crosswinds.

Preferably, the two panels are substantially perpendicular to one another adjacent to the bracket. However, the two panels can be set at various angles to one other as desired. The profiled section can be adapted such that its edge receiving profiles are oriented so as to receive the panels at the desired orientation.

The profiled section may further include a fastener receiving profile, which receives the fastener. Preferably, the fastener is releasable such that the assembled panels can be readily disassembled for, e.g., repair. In a preferred embodiment, the fastener is a bolt, and the bolt head is received in the fastener receiving profile. A nut may be threaded upon the bolt and tightened against the respective clamping bracket so as to provide a clamping force for retaining the panels in the profiled section.

The clamping bracket may have flanges which engage with pockets formed in the panels. The pockets are preferably cut blind into the panels. For example, a bracket may have two flanges, each for engaging a pocket of a respective panel. By securing the fastener between the bracket and the profiled section, the flanges of the bracket can draw the panel edges into clamping engagement between the bracket and the profiled section.

The profiled section preferably has a substantially continuous profile between its ends. The profiled section can be cut to any desired length, can have a linear portion and/or a curvilinear portion in its axial direction, and can be formed as an extrusion such that the brackets and fasteners can be freely positioned along its length.

An adhesive and/or sealant may be applied between the edge of each panel and the profiled section. This may be applied to the panel edge and/or the profiled section prior to clamping.

In a preferred embodiment, the invention is applied to a mobile vehicle comprising one or more of the panel assemblies, wherein the panels are body shell panels of the mobile vehicle. The vehicle may be, for example, a caravan, motor-home, box van, or the like.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
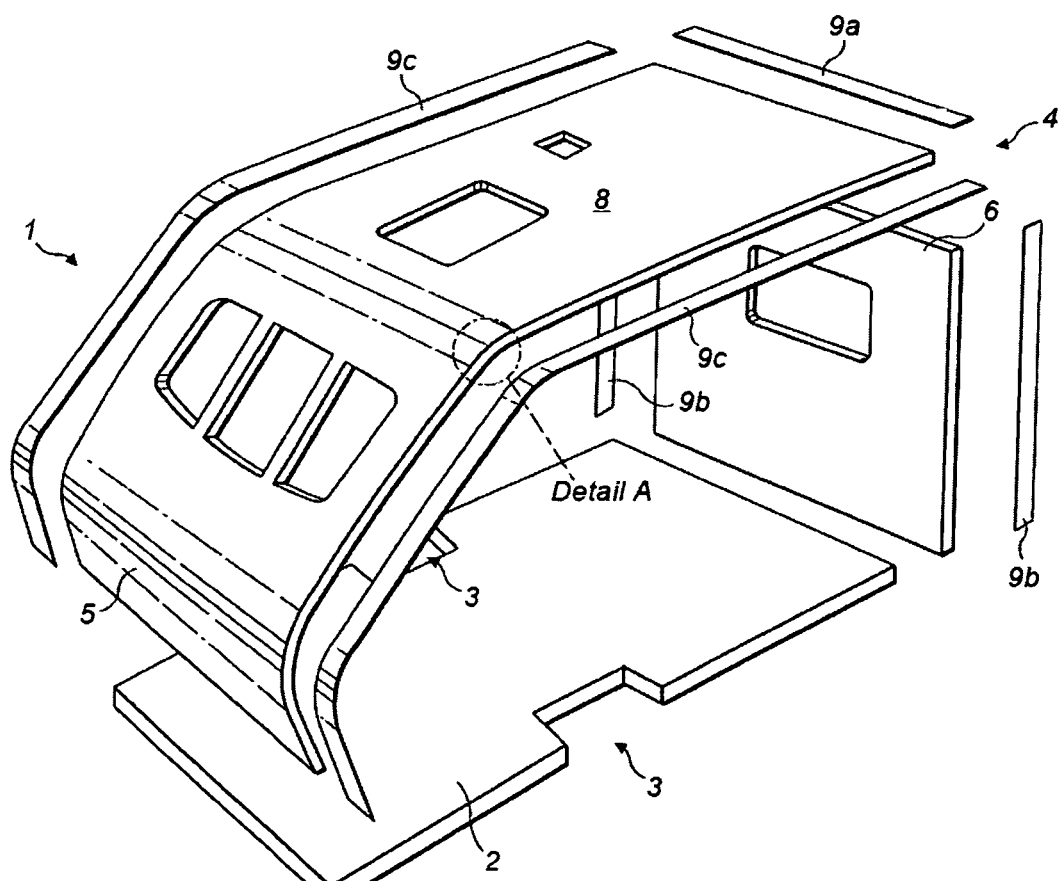
FIG. 1 illustrates an exploded schematic view of a caravan (side panels removed for clarity) showing the location of the profiled sections.

FIG. 1 illustrates schematically some key components of a body of a caravan 1. The caravan 1 has a floor 2 having cuts outs 3 for wheels (not shown), which supports a body 4 having a shell construction. The body 4 includes several large composite panels. These form the front 5, back 6, sides 7 (not shown in FIG. 1 for clarity) and roof 8. In the embodiment depicted in FIG. 1, the front panel 5 and the roof panel 8 are unitary. However, the front 5 and roof 8 could be formed of separate panels joined together.

The roof panel 8 is joined to the back panel 6 by profiled section 9a. The back panel 6 is joined to each of the side panels 7 by profiled sections 9b. The side panels 7 are joined to the front and roof panels 5, 8 by profiled sections 9c.

The joints between the various panels 5, 6, 7, 8 each have a similar construction and the joint between the roof panel 8 and the side panel 7 in the region indicated as "detail A" in FIG. 1 will now be described in detail with reference to FIG. 2.

The roof panel 8 is oriented substantially perpendicularly with respect to the side panel 7. In contrast with the prior art construction techniques, an edge 10 of the side panel 7 does not meet with an edge 11 of the roof panel 8. Instead, the profiled section 9c forms a "bridge" between the edges 10, 11 of the panels 7, 8. The profiled section 9c has a smooth, arcuate outer surface 12 which bridges between the outer surfaces 13, 14 of the panels 7, 8 respectively.

The profiled section 9c has first and second edge receiving profiles 15, 16 which receive respective edges 10, 11 of the panels 7, 8. The edge receiving profiles, 15, 16 are substantially "L" shaped in profile. The edge receiving profiles 15, 16 are oppositely handed and oriented substantially perpendicular to one another. In this way, the two panels 7, 8 are received against an interior side of the profile member 9c.

Figure 2:
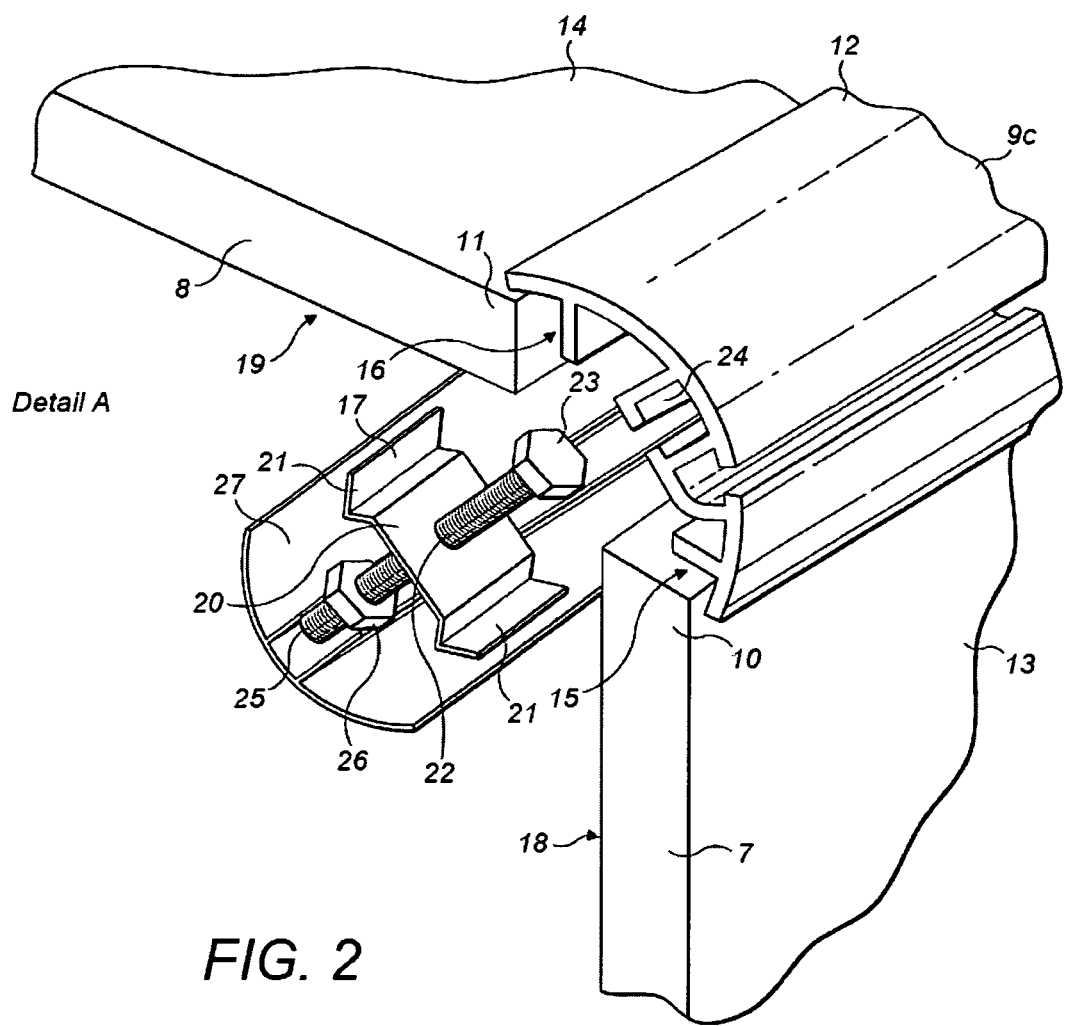
FIG. 2 illustrates an exploded view of a joint between two panel edges of the caravan.

It will be appreciated that the edge receiving profiles 15, 16 are "L" shaped in the embodiment depicted in FIG. 2 since the edges 10, 11 of the panels 7, 8 have straight cut edges. If the edges of the panels are not straight cut then the edge receiving profiles may be shaped differently so as to correspond to the profile of the edges of the panels. Furthermore, whilst in FIG. 2 the edge receiving profiles 15, 16 are oriented substantially perpendicular to one another as a result of the substantially perpendicular relationship between the panels 7 and 8, different panel orientations may be matched with a profiled section having appropriately oriented edge receiving profiles.

The edges 10, 11 of the panels 7, 8 are retained in the profiled section 9c by a clamping force provided by a clamping bracket assembly, which will be described below. The edges 10, 11 of the panels 7, 8 are configured to engage with the edge receiving profiles 15, 16 such that the outer surfaces 13, 14 of the panels 7, 8 are nested against interior facing surfaces of the "L" shaped profiles 15, 16. A clamping bracket 17 is adapted to engage with blind slots 34 (shown in FIGS. 3 to 5) cut in interior surfaces 18, 19 of the panels 7, 8. The clamping bracket 17 has a plate portion 20 and a pair of flanges 21 extending from opposing edges of the plate portion 20. The flanges 21 are substantially planar and oriented substantially perpendicular to the plane of the respective panel 7, 8 with which it is to be engaged. The flanges 21 are configured to enter the blind slots 34 formed in the panels 7, 8. The plate portion 20 has a through bore which receives a bolt 22. The bolt 22 acts as a fastener to connect between the clamping bracket 17 and the profiled section 9c so as to clamp the edges 10, 11 of the panels 7, 8 between the profiled section 9c and the clamping bracket 17.

The bolt 22 has a head end 23 which is adapted to be received in a fastener receiving profile 24 formed in the profiled section 9c, between the two edge receiving profiles 15, 16. The fastener receiving profile 24 is essentially an open channel formed of a pair of oppositely oriented "L" shaped projections extending from the interior side of the profiled section 9c. The fastener receiving profile 24 is substantially continuous along the axial length of the profiled section 9c. This enables the head 23 of the bolt 22 to be slid from one end of the profiled section 9c within the fastener receiving profile 24 into a desired position along the length of the profiled section 9c. A shank 25 of the bolt 22 is threaded and is adapted to be disposed through the through bore in the plate portion 20 of the clamping bracket 17.

A securing nut 32 (not shown in FIG. 2) is configured to be threadably received on the threaded portion 25 of the bolt 22. The securing nut 32 is adapted to fix the bolt 22 in a desired location along the length of the profiled section 9c.

A lock nut 26 is configured to be threadably received on the threaded portion 25 of the bolt 22 on the side of the clamping bracket 17 opposite the nut 32. The lock nut 26 is adapted to clamp the clamping bracket 17 against the interior side of the panels 7, 8.

Assembly of the joint between the two panels 7, 8 will now be described in detail. The head end 23 of the bolt 22 is slid within the fastener receiving profile 24 from one end of the profiled section 9c until the bolt 22 is in a desired location along the axial length of the profiled section 9c. The securing nut 32 would upon the shank 25 of the bolt 22 and is tightened against the fastener receiving profile 24 so as to fix the bolt in the desired location.

The panels 7 and 8 are positioned as depicted in FIG. 2 and the profiled section 9c having the bolt 22 is offered up such that the edges 10, 11 of the panels 7, 8 are received in the respective edge receiving profiles 15, 16. The blind slots 34 cut in the interior surfaces 18, 19 of the panels 7, 8 which are configured to receive the flanges 21 of the clamping bracket 17, should be aligned with the position of the bolt 22.

The clamping bracket 17 is then offered up such that the threaded shank portion 25 of the bolt 22 is received in the through bore of the clamping bracket 17, and the flanges 21 are engaged with their respective blind slots 34 cut in the panels 7, 8. The nut 26 is then wound upon the distal end of the bolt 22 opposite the head end 23 and tightened to a predetermined torque so as to clamp the edges 10, 11 of the panels 7, 8 between the profiled section 9c and the clamping bracket 17. The predetermined tightening torque is selected according to the material properties of the composite panels 7, 8 so as to avoid excessive defamation.

In order to securely clamp the edges 10, 11 of the panels 7, 8, a plurality of clamping brackets 17 together with their associated bolts 22 and nuts 26, 32 are disposed at predetermined spaced intervals along the axial length of the profiled section 9c. In forming the joint between the panels 7, 8, the appropriate number of bolts 22 are slid along the fastener receiving profile 24 to their respective desired locations and secured in those positions using respective securing nuts 32. Then, the clamping brackets 17 are offered up consecutively so as to receive their respective bolt shanks 25 before threading and tightening the respective lock nuts 26.

Once each of the clamping brackets 17 along the length of the profiled section 9c have been retained in place by tightening the nuts 26, an interior trim section 27 is fitted over the protruding ends of the bolts 22. The trim section 27 provides an excellent cosmetic finish as well as providing a channel through which services, such as electrical cables, can be routed.

Figure 3:
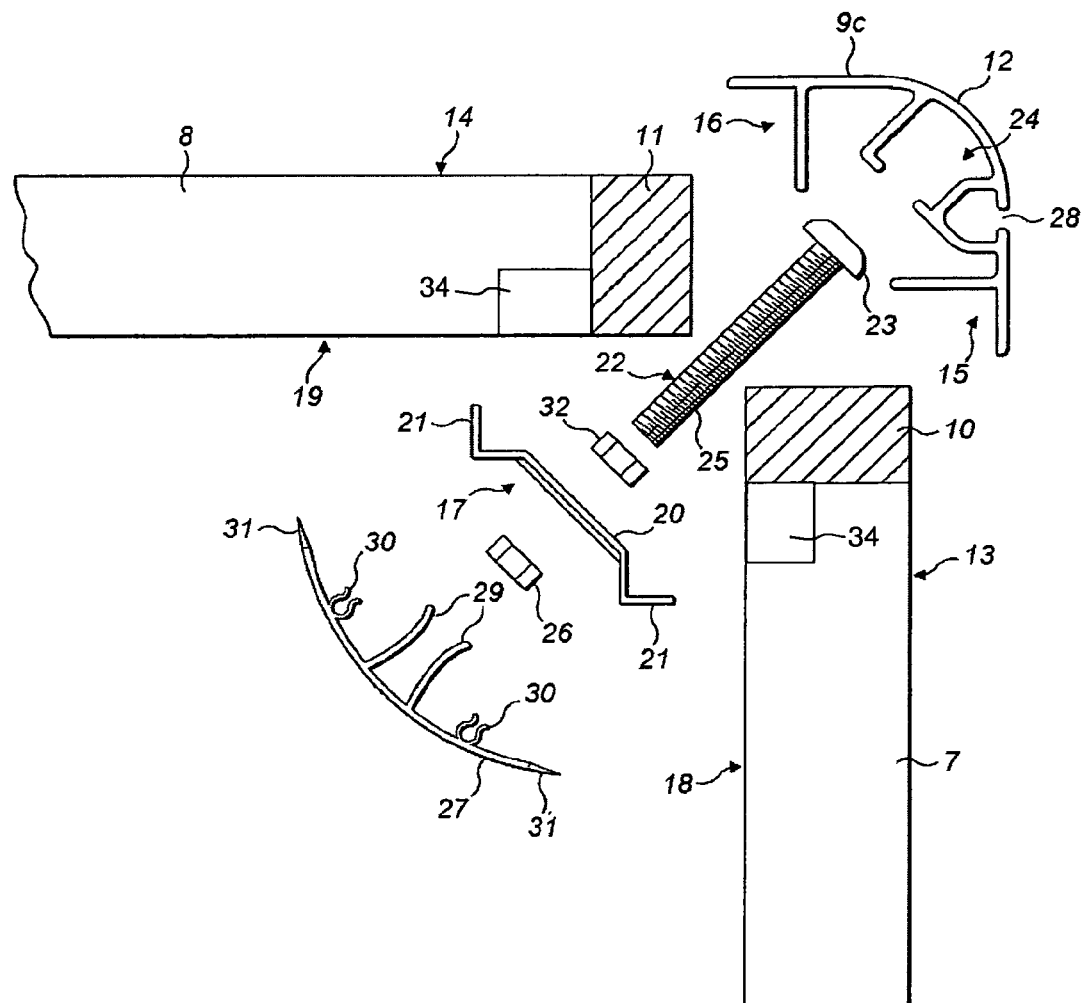
FIG. 3 illustrates an exploded section view of the joint components.

FIG. 3 illustrates an exploded section view through the joint. As can be seen from FIG. 3, the profiled section 9c also includes an optional awning profile 28 which opens in the exterior surface 12 of the profiled section 9c. This awning profile 28 is adapted to receive and retain the edge of an awning which may be affixed to one side of the caravan 1. As can also be seen from FIG. 3, the trim section 27 has a pair of protruding grip elements 29 having serrated internal surfaces which are adapted to grip the threaded shank portion 25 of the bolts 22. In this way, the trim section 27 can be securely retained without the need for additional fasteners. The trim section 27 further includes cable cleats 30 to receive the aforementioned electrical cables, and deformable elastomeric edges 31 for sealing against the interior surfaces 18, 19 of the panels 7, 8.

Figure 4:
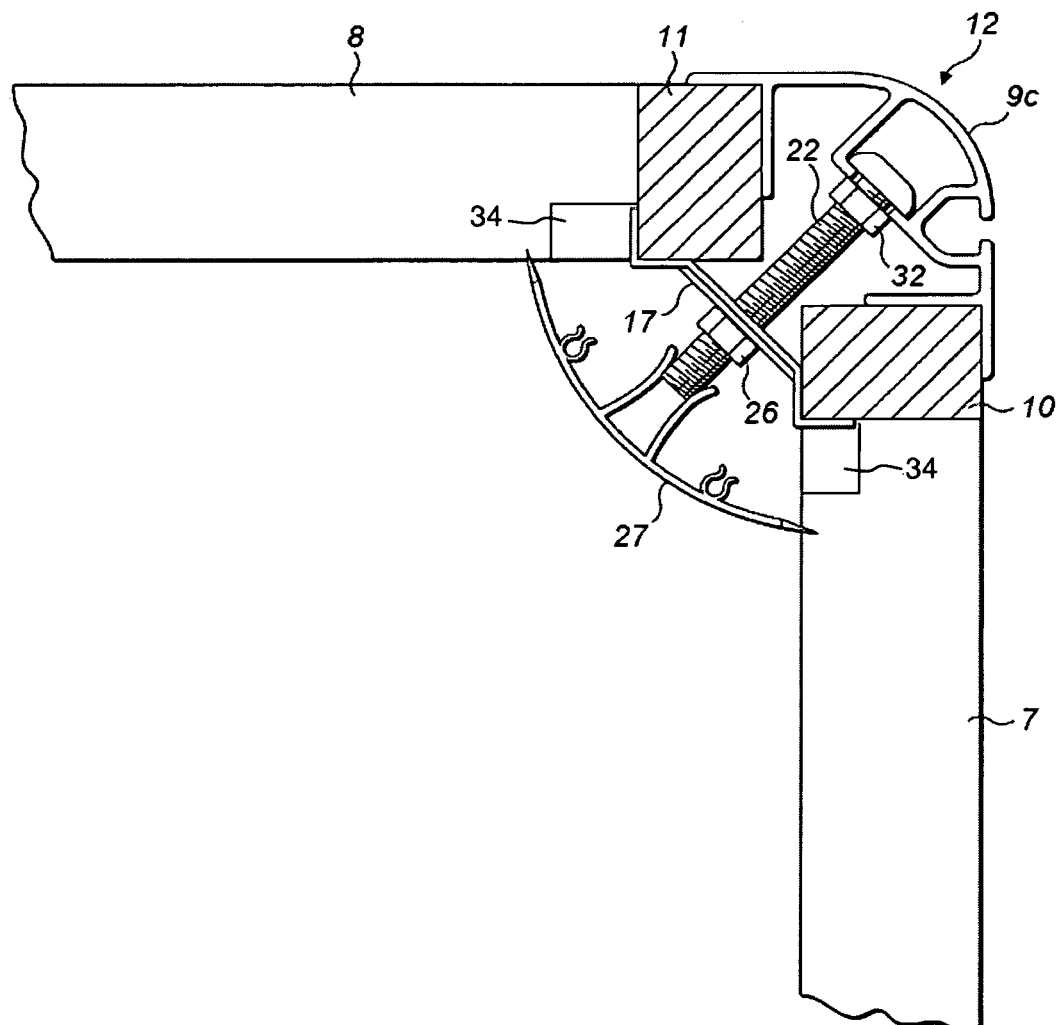
FIG. 4 illustrates a section view of the assembled joint.
Figure 5:
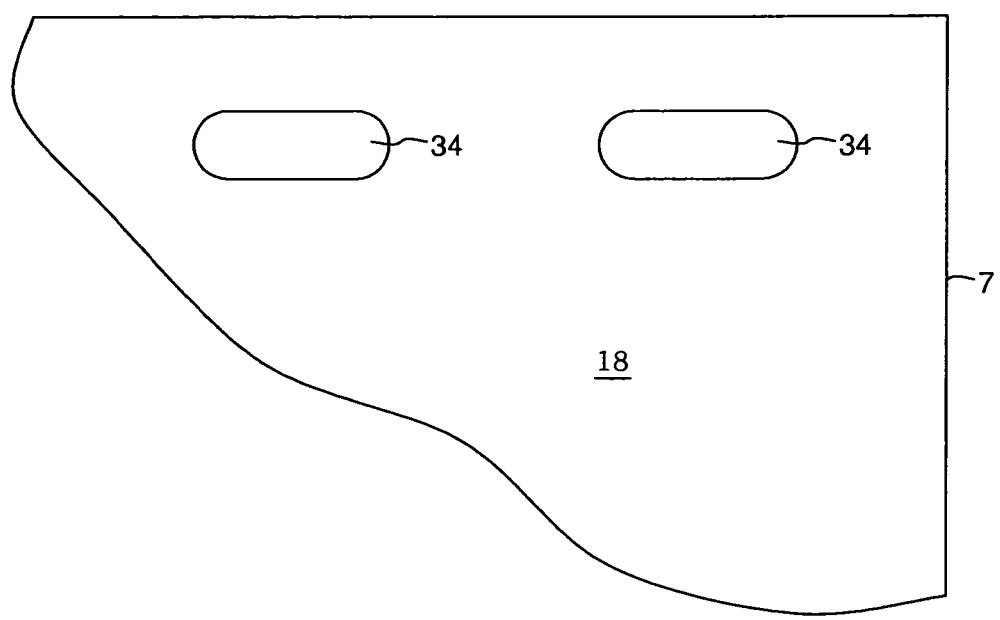
FIG. 5 is a partial face view of a panel, illustrating blind slots in a face of the panel.

FIG. 4 illustrates a section view of the assembled joint. In some circumstances it may be desirable to apply an adhesive and/or sealant between the edges 10, 11 of each panel 7, 8 and the profiled section 9c.

Constructing the caravan 1 as described above has several advantages over prior art construction techniques. By clamping, rather than screwing together, the edges of the panels, the resultant joint can be constructed more reliably and will provide a long lasting effective sealed joint. The joint may be assembled more quickly than before as the bolt positions and tightening torque are determined in advance. Furthermore, since the straight cut edges of the panels 7, 8 no longer dictate the outer surface profile of the joint, the smooth arcuate outer surface 12 of the profiled section 9c provides improved aerodynamic performance for the caravan 1 making the caravan less prone to buffeting by cross winds. However, most importantly, the clamped joint between the edges of the panels 7, 8 provides a far stiffer joint construction when compared with the prior art screwed construction.

Whilst the joint described in detail above is that between the edges of panels 7 and 8 using the profile section 9c, it will be appreciated from FIG. 1 that the joints between the back panel 6 and the roof 8, and between the front and roof panel 5, 8 to the side panels 7 using the profiled sections 9a and 9b are constructed in a virtually identical manner.

It will also be appreciated from FIG. 1 that the profiled section 9c includes both linear and curvilinear portions. By providing the profiled section 9c as a substantially continuous profile, the same clamping brackets and bolts can be used to join both the flat roof panel 8 and the curved front panel 5 to the side panels 7. In this way, it becomes possible to provide the front panel 5 and the roof panel 8 as a unitary component, which reduces part count and, more particularly, reduces the number of joints between body shell panels of the caravan 1. Reducing the number of joints between panels significantly improves the thermal performance of the caravan, as well as providing improved weatherproofness and aerodynamic and aesthetic design flexibility.

Whilst in the preferred embodiment described above, the fasteners for connecting between the clamping brackets and the profiled section are bolts, it will be appreciated that other types of fasteners may be used.

Furthermore, whilst in the specific embodiment described above, the invention is described as applied to a caravan construction, it will be appreciated that the invention may be similarly applied to other mobile vehicles, such as motor homes, box vans and the like; and may also be applied to non-vehicular items. For example, the side walls and roof of a prefabricated building may be joined using similar construction techniques to those described above.

Although the invention has been described above with reference to one or more preferred embodiments, it will be appreciated that various changes or modifications may be made without departing from the scope of the invention as defined in the appended claims.

The invention claimed is:

1. A mobile vehicle having a shell construction comprising:
    a plurality of body shell composite panels, each panel having an edge;
    a profiled section, with respective edges of two adjacent panels of the plurality of body shell composite panels being joined to the profiled section, the adjacent panel edges being received in respective edge receiving profiles of the profiled section;
    an adhesive or sealant material between the profiled section and each of the adjacent panel edges, respectively, so as to provide a weatherproof seal;
    a plurality of fasteners; and
    a plurality of clamping brackets;
    wherein each of the clamping brackets is engaged with the two adjacent panels, and each of the fasteners is connected between a respective one of the clamping brackets and the profiled section so as to clamp the two adjacent panel edges between the profiled section and the clamping brackets at spaced intervals along the profiled section; and
    wherein each of the clamping brackets has flanges which engage, respectively, with slots formed in respective interior surfaces of the two adjacent panels, and each one of the slots is structured and dimensioned to receive one of the flanges but not to extend, in an axial direction of the profiled section, for an entire length of the panel in which that slot is formed.

2. A mobile vehicle according to claim 1, wherein the two adjacent panels are substantially perpendicular adjacent to the profiled section.

3. A mobile vehicle according to claim 1, wherein the fasteners are received in a fastener receiving profile of the profiled section.

4. A mobile vehicle according to claim 1, wherein each fastener is a bolt.

5. A mobile vehicle according to claim 3, wherein each fastener is a bolt, and each bolt head is received in the fastener receiving profile.

6. A mobile vehicle according to claim 1, wherein the profiled section has a substantially continuous profile between its ends.

7. A mobile vehicle according to claim 1, wherein a cross-section of the profiled section, that is substantially perpendicular to the axial direction of the profiled section, has a linear portion and/or a curvilinear portion.

8. A method of constructing a mobile vehicle body having a shell construction, the method comprising:
    positioning an edge of each of two body shell composite panels in a respective edge receiving profile of a profiled section;
    applying an adhesive or sealant material between the edge of each panel and the profiled section, so as to provide a weatherproof seal;
    engaging a plurality of clamping brackets with the panels; and
    connecting the clamping brackets to the profiled section using a plurality of respective fasteners so as to clamp the edges of the panels between the profiled section and the clamping brackets at spaced intervals along the profiled section;
    wherein each of the clamping brackets has flanges which engage, respectively, with slots formed in respective interior surfaces of the two panels, and each one of the slots is structured and dimensioned to receive one of the flanges but not to extend, in an axial direction of the profiled section, for an entire length of the panel in which that slot is formed.

9. A method according to claim 8, wherein each fastener is a bolt and the method further comprises threading a nut upon each bolt and tightening the nut against the respective clamping bracket.

10. A method according to claim 8, further comprising securing each fastener to the profiled section at a desired position prior to connecting the respective clamping bracket.

* * * * *